April 12, 1955  W. J. McMURRAY  2,706,017
LUBRICATOR FOR SPEEDOMETERS
Filed May 7, 1953

INVENTOR
WILLIAM J. McMURRAY
BY Louis C. Smith
ATTORNEY

2,706,017
LUBRICATOR FOR SPEEDOMETERS

William J. McMurray, Winthrop, Mass.

Application May 7, 1953, Serial No. 353,619

1 Claim. (Cl. 184—105)

This invention relates to a lubricator for speedometers, and especially speedometers such as are used in automobiles.

While the automobile speedometer does not require frequent lubrication, yet if it is not properly lubricated the bearing parts become dry and are apt to "freeze," a condition which may result in breaking the flexible drive shaft for the speedometer.

The construction of automobile speedometers is such that there is no quick and easy way of lubricating them, which may be a reason why the proper lubrication of the speedometer is sometimes neglected.

It is an object of the present invention to provide a simple lubricator for speedometers by which the speedometer can be quickly and easily lubricated without removing it from the automobile.

In order to give an understanding of the invention I have illustrated a selected embodiment thereof in the accompanying drawings which will now be described.

Figure 1:
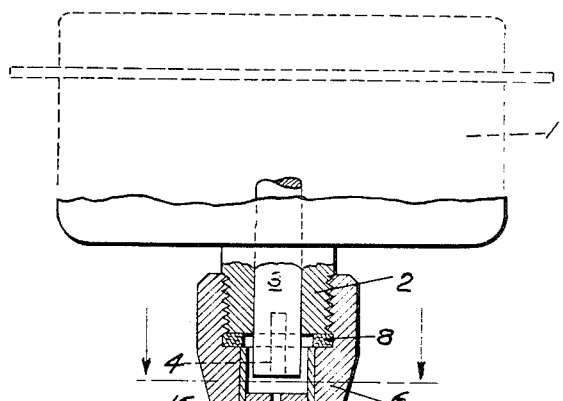
Fig. 1 is a view showing in section a lubricator embodying my invention and attached to the shaft-attaching hub of the speedometer.

In the drawings, 1 indicates the speedometer of an automobile which is provided with the usual attaching hub 2 to which the sheath of the flexible driving shaft is adapted to be attached, said hub being exteriorly screw-threaded and forming a bearing for the main drive shaft 3 of the speedometer, which shaft extends through and projects beyond the hub. It will be understood that the flexible drive shaft of the speedometer is connected to the shaft 3 when the sheath is secured to the hub 2.

My improved lubricator comprises a cylinder 5 open at one end and having secured to its open end an attaching member 6 provided with interior screw threads adapted to be screwed onto the exterior screw threads of the hub 2, as shown in Fig. 1. The cylinder 5 has within it near its open end a partition member 15 provided with a restricted opening 16.

Also situated within the cylinder 5 in the rear of the partition 15 is a piston 10 which is backed by a spring 13, the latter being situated between the piston 10 and the closed end 9 of the cylinder. Said spring normally exerts a pressure against the piston tending to move it forwardly toward the open end of the cylinder.

Associated with the piston 10 is a piston rod 11 which extends through the closed end 9 of the cylinder and which is shown as having a knob 12 attached to its projecting end.

Figure 2:
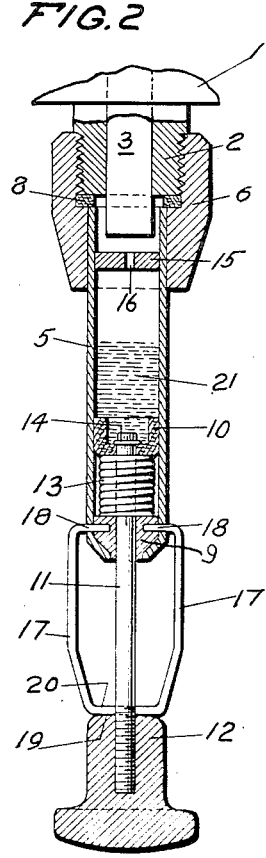
Fig. 2 is a similar view showing the lubricator loaded with a charge of lubricant.
Figure 3:
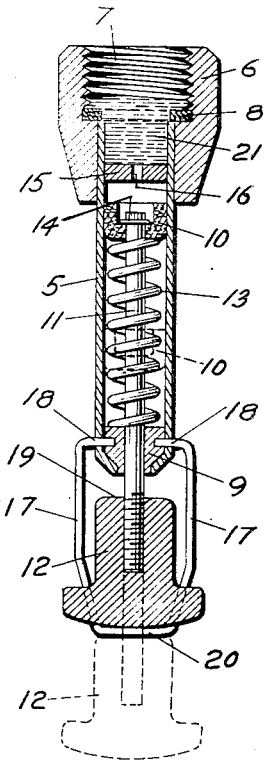
Fig. 3 is a sectional view of the lubricator showing the manner in which the charge of lubricant is introduced thereinto.
Figure 4:
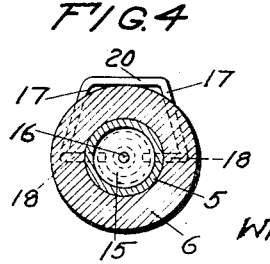
Fig. 4 is a section on the line 4—4, Fig. 1.

The lubricant which is usually used in lubricating speedometers is a light oil, and in using the lubricating device, a charge 21 of lubricant is poured into the open end of the cylinder while the lubricator is disconnected from or free from the speedometer, as shown in Fig. 3. The position of the partition 15 within the cylinder is such that the space between the partition and the open end of the cylinder provides a space of a size to receive approximately the correct quantity of oil or lubricant for lubricating the speedometer. The lubricator is charged with the lubricant 21 while the piston 10 is in its forward position, as shown in Fig. 3, the size of the restricted opening 16 being such that no appreciable amount of the lubricant will flow through said opening during the filling operation. After the lubricator has received its charge of lubricant, then the piston 10 is pulled backwardly by means of the knob 12 and piston rod 11, as shown in Fig. 2, during which operation the suction which is produced in the cylinder by the backward movement of the piston will draw the charge 21 of lubricant through the restricted opening 16 into the body of the cylinder, as illustrated in Fig. 2.

Means are provided for locking the piston in its retracted position while the charged lubricator is being attached to the hub 2. For this purpose there is provided a latch member 17 which is pivotally secured to the closed end of the cylinder, as shown at 18, such latch member being in the form of a loop and being shaped so that when the piston is in its retracted position the end 20 of the latch may be swung over the end 19 of the knob, as shown in Fig. 2, thereby locking the knob of the piston rod in its retracted position.

The latch 17 thus holds the piston retracted while the charged lubricator is being attached to the hub 2 of the speedometer. The head 6 of the lubricator is provided with a gasket 8 which seats against the end of the hub 2, thereby making a tight joint at this point.

After the charged lubricator has thus been attached to the hub 2, then the latch 17 is released, and upon such release the spring 13 will move the piston 10 forwardly and subject the charge 21 of lubricant to compression, thereby forcing the lubricant through the restricted opening 16 and into the space at the open end of the cylinder into which the projecting end of the shaft 3 extends. The continued pressure exerted by the spring 13 against the lubricant forces the same into the hub 2 around the shaft 3, and by allowing this pressure to continue for ten or fifteen minutes sufficient lubricant will be forced into the speedometer to properly lubricate the shaft 3 and other parts thereof.

After the lubricator has remained attached to the hub 2 for a sufficient length of time, the operator may then retract the piston 10 again, thereby drawing by suction through the restricted opening 16 any surplus lubricant which may remain in the open end of the cylinder. When the piston has thus been retracted the second time, it will preferably be locked in its retracted position by the latch 17 while the operator unscrews the head 6 from the hub 2.

After the lubricator has been removed from the hub 2 then the flexible drive shaft for the speedometer may be again connected to the hub, the lubrication of the speedometer being completed at this time.

With my invention it is possible for an automobile mechanic to lubricate the speedometer during the time that he is lubricating the chassis or changing the oil, or performing any other service which the automobile requires, because after the lubricator has been attached to the hub 2 and the latch has been released, the lubrication of the speedometer takes place automatically during a period of ten to fifteen minutes by the action of the spring 13.

The spring 13 is designed to provide the proper pressure against the charge 21 of lubricant to effect the desired lubrication of the speedometer, and in order to obviate the possibility that anyone might apply surplus pressure to the piston by pushing forwardly on the knob 12 during the lubricating operation, the piston 10 is loosely mounted on the piston rod 11, the latter having at its end a collar 14 which engages the front face of the piston so that the backward movement of the piston rod will retract the piston. If, however, during the lubricating operation and after the latch 17 has been released to allow the spring 13 to yieldingly press the piston 10 forward, anyone should apply pressure to the knob 12, the only result will be that the piston rod will be moved forward through the piston and the latter will not be subjected to any undue pressure.

I claim:

A lubricator for speedometers comprising a cylinder open at one end and closed at the other, a partition extending across said cylinder adjacent to but spaced from its open end and having a restricted opening, said partition providing said cylinder at its open end with a measuring chamber to receive a charge of lubricant, a piston in said cylinder between said partition and its closed end, spring means acting against said piston and tending to move it toward the open end of the cylinder, means to retract the piston against the action of the spring means thereby to draw by suction said charge of lubricant in the measuring chamber through the restricted opening and into the space in said cylinder between the partition and the piston, releasable locking means to hold the piston in its retracted position, and means for connecting the open end of the cylinder to the shaft attachment hub of a speedometer through which the speedometer shaft extends, whereby when the locking means is released the spring moves the piston forwardly, thereby subjecting the charge of lubricant between the piston and the partition to compression and gradually forcing the lubricant through the restricted opening and around the projecting end of the speedometer shaft.

References Cited in the file of this patent

UNITED STATES PATENTS

| | | |
|---|---|---|
| 786,701 | Williams | Apr. 4, 1905 |
| 1,299,078 | Weiss | Apr. 1, 1919 |
| 1,370,803 | Fesler | Mar. 8, 1921 |
| 2,515,611 | Preszler | July 18, 1950 |

FOREIGN PATENTS

| | | |
|---|---|---|
| 221,078 | Switzerland | Aug. 1, 1942 |